United States Patent
Baltzer et al.

[11] Patent Number: 5,967,336
[45] Date of Patent: Oct. 19, 1999

[54] VIBRATING SCREEN ASSEMBLY WITH IMPROVED FRAME

[75] Inventors: Terry L. Baltzer, Talala; Robert E. Norman; Richard W. Von Drehle, both of Tulsa, all of Okla.

[73] Assignee: Southwestern Wire Cloth, Inc., Tulsa, Okla.

[21] Appl. No.: 08/922,205

[22] Filed: Sep. 2, 1997

[51] Int. Cl.⁶ ............................................. B07B 1/49
[52] U.S. Cl. ........................ 209/403; 209/405; 210/389
[58] Field of Search ................................ 209/397, 401, 209/403, 405, 408, 412; 210/314, 486, 489, 388; 248/346.01, 346.02, 346.05

[56] References Cited

U.S. PATENT DOCUMENTS

| | | |
|---|---|---|
| 1,009,069 | 11/1911 | Hunnicutt . |
| 1,147,279 | 7/1915 | Sweetland . |
| 2,271,900 | 2/1942 | Mowbray ................................ 209/403 |
| 2,335,084 | 11/1943 | Rice ....................................... 209/408 |
| 2,576,794 | 11/1951 | Jost et al. ............................... 209/405 |
| 2,870,910 | 1/1959 | Wehner .................................. 209/396 |
| 2,902,165 | 9/1959 | Imershein .............................. 210/486 |
| 2,959,285 | 11/1960 | Tonjes et al. .......................... 209/319 |
| 3,012,674 | 12/1961 | Hoppe ................................... 209/401 |
| 3,508,649 | 4/1970 | Kahane et al. ......................... 209/323 |
| 3,970,549 | 7/1976 | Ennis et al. ........................... 209/341 |
| 4,380,494 | 4/1983 | Wilson .................................. 209/319 |
| 4,668,394 | 5/1987 | Badolato et al. ...................... 210/314 |
| 4,728,422 | 3/1988 | Bailey ................................... 210/314 |
| 4,840,728 | 6/1989 | Connolly et al. ...................... 209/405 |
| 5,137,622 | 8/1992 | Souter ................................... 209/403 |
| 5,199,574 | 4/1993 | Hollyfield, Jr. et al. ............... 209/315 |
| 5,248,043 | 9/1993 | Dorn ..................................... 209/399 |
| 5,256,291 | 10/1993 | Cagle .................................... 210/499 |
| 5,361,476 | 11/1994 | Leopold ................................... 29/417 |
| 5,385,669 | 1/1995 | Leone, Sr. ............................. 210/488 |
| 5,392,925 | 2/1995 | Seyffert ................................. 209/405 |
| 5,417,858 | 5/1995 | Derrick et al. ........................ 210/388 |
| 5,417,859 | 5/1995 | Bakula .................................. 210/388 |
| 5,538,139 | 7/1996 | Keller ................................... 209/382 |
| 5,636,749 | 6/1997 | Wojciechowski .................. 210/389 X |

FOREIGN PATENT DOCUMENTS

| | | | |
|---|---|---|---|
| 0032436 | 7/1981 | European Pat. Off. ......... B07B 1/46 |
| 0169698 | 1/1986 | European Pat. Off. ......... B07B 1/46 |
| 2092917 | 8/1982 | United Kingdom ............ B07B 1/46 |
| 2276572 | 5/1994 | United Kingdom . |

*Primary Examiner*—William E. Terrell
*Assistant Examiner*—Gene O. Crawford
*Attorney, Agent, or Firm*—Head, Johnson & Kachigian

[57] ABSTRACT

A vibrating screen assembly having a frame with a pair of opposed sides and a pair of opposed ends. The frame includes a planar surface and an upstanding lip extending vertically from the planar surface to form a rim enclosure. A leg extends downward vertically from the planar surface in a direction away from said lip. A ledge extends perpendicularly from the downward leg. A plurality of tubular cross supports rest on the ledge and are connected to the leg. A perforated plate with a plurality of screen cloths thereon is positioned within the rim enclosure and secured to the planar surface of the frame.

3 Claims, 4 Drawing Sheets

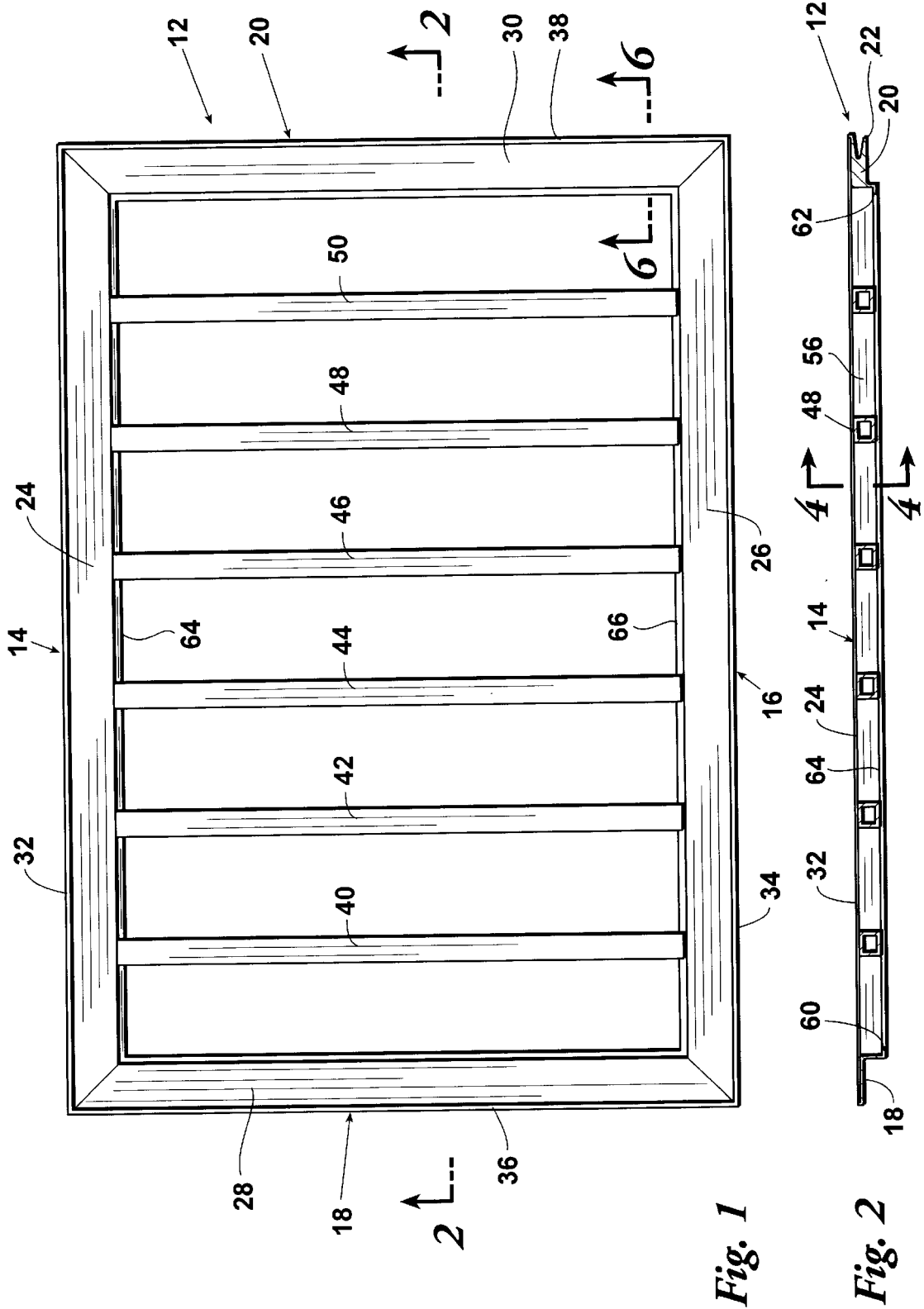

5,967,336

VIBRATING SCREEN ASSEMBLY WITH IMPROVED FRAME

BACKGROUND OF THE INVENTION

1. Field of the Invention

The present invention is directed to a screen assembly for vibrating screen machinery. In particular, the present invention is directed to a vibrating screen assembly for vibrating machinery wherein a plurality of screen layers are positioned on an improved frame and secured to the frame for improved efficiency, rigidity and durability.

2. Prior Art

Vibrating shakers utilize a screen assembly or assemblies to separate solid material from liquids and fine solid particles. The screen assembly is typically secured in and to the vibrating machinery through use of a frame. The frame is removably attached to the vibrating shaker. A mixture of materials is delivered or fed to the top of the screen assembly. The screen assembly is vibrated by a motor to vibrate the screen assembly at a high frequency.

The force of gravity separates the liquid and particles smaller than the pore size of the smallest screen layer. The screen assembly may be inclined so that the solids larger than the "cut point" will move across the screen where they are gathered and disposed of. At the same time, the liquid and particles smaller than the cut point will pass through the screen assembly and will also be collected.

The vibrating shaker machines are often used at remote locations, such as oil well drilling sites. The replacement screen assemblies must, thus, be transported great distances to these remote locations. A relatively lightweight screen assembly is, therefore, desirable.

Since the screen assembly must be transported and then installed in the field, any sharp edges on the screen assembly should be minimized.

There are various types of screen assemblies having various frames. In one configuration, a plurality of screen cloth layers are attached to a perforated plate which is, in turn, connected to the frame. The perforated plate has a large number of small openings to minimize the unsupported spans of screen cloth. It is important to achieve good adhesion between the perforated plate and the frame. Thus, the frame must have an adequate amount of planar surface to mate securely with the perforated plate.

The screen assembly is subject to tremendous stresses by virtue of the machinery vibrating it. Additionally, the screen assembly is subject to stresses from the weight of the material to be separated on the top layer of the screen. It is known that the screen assemblies will wear from usage and have a certain useful life, often in hours.

In order to balance screen life with through-put, it has been known to secure multiple layers of wire screen cloth to a perforated panel. The perforated panel is, in turn, secured to the frame. In the manufacturing process, the perforated panel and accompanying screens must be accurately aligned before adhesively bonding to the frame. It would be desirable to provide a self-alignment mechanism to align the perforated plate with the frame.

It is a principal object and purpose of the present invention to provide a vibrating screen assembly having a frame which will position the perforated panel thereon during the assembly process and discourage separation of the frame from the perforated panel.

It is an additional object and purpose of the present invention to provide a vibrating screen assembly with a blunt, safe edge around the perimeter to prevent personnel injury.

It is an additional object and purpose of the present invention to provide a vibrating screen assembly with good adhesion between the frame and the perforated plate.

It is a further object and purpose of the present invention to provide a vibrating screen assembly that will have a maximum useful life while being simple and inexpensive to manufacture.

It is a further object and purpose of the present invention to provide a screen assembly having a strong frame which will provide strength from side to side and provide strength from end to end.

SUMMARY OF THE INVENTION

The present invention is directed to a vibrating screen assembly having a frame which includes a pair of opposed sides and a pair of opposed ends. Each side has a flat planar surface and each end has a flat, planar surface which are aligned with each other in the assembled frame. An upstanding lip extends vertically from each of the planar surfaces, the lips together defining an area forming a rim enclosure.

Each opposed side of the frame includes a downwardly extending leg which extends downward perpendicular to the planar surface.

Finally, a ledge extends perpendicular to the downward legs. The ledges are opposed to and face each other.

The frame also includes a plurality of tubular cross supports which extend between the sides and are parallel to the ends. The tubular cross supports rest on and are attached to the ledges.

A perforated plate is attached and secured to the frame in the assembled condition. The perforated plate includes a plurality of openings which are punched or otherwise formed in the plate.

The frame is adhesively secured to the perforated plate. The plate and the accompanying screen cloths are aligned on the frame by the lips which form a rim enclosure.

In order to produce a vibrating screen assembly in accordance with the present invention, the sides and ends of the frame are extruded in lengths, such as from extruded aluminum. The frame sections are cut to desired lengths to form the pair of opposed sides and the pair of opposed ends. The sides and ends are cut at 45° angles so that they will mate together to form an exterior frame.

Likewise, lengths of tubular support are extruded, such as from extruded aluminum. Tubular support members are cut from these lengths to the desired dimension. The opposed sides and the opposed ends are clamped together and then tack welded. Thereafter, the entire frame, including the cross supports, is welded together. The joints between the cross supports and the sides of the frame are strengthened since the cross supports rest on the ledges.

The perforated plate is fabricated with hexagonal or other openings and, thereafter, coated with epoxy. Both heat and pressure are used to bond the multiple screen mesh layers to the perforated plate. Accordingly, the perforated plate and the screen cloths are secured together. Thereafter, the perforated plate and the accompanying screen cloths are secured to the frame by glue or other adhesives. The lips form a rim enclosure that aligns the perforated plate and accompanying screen cloths on the frame. The plate is prevented from moving from side to side or end to end with respect to the frame because of the rim enclosure. The lip also provides a blunt, safe edge around the perimeter of the screen assembly which keeps personnel from cutting their hands.

BRIEF DESCRIPTION OF THE DRAWINGS

FIG. 1 is a top view of a frame which is an element of a vibrating screen assembly constructed in accordance with the present invention;

FIG. 2 is a sectional view of the frame taken along section line 2—2 of FIG. 1;

DETAILED DESCRIPTION OF THE PREFERRED EMBODIMENTS

Figure 3:
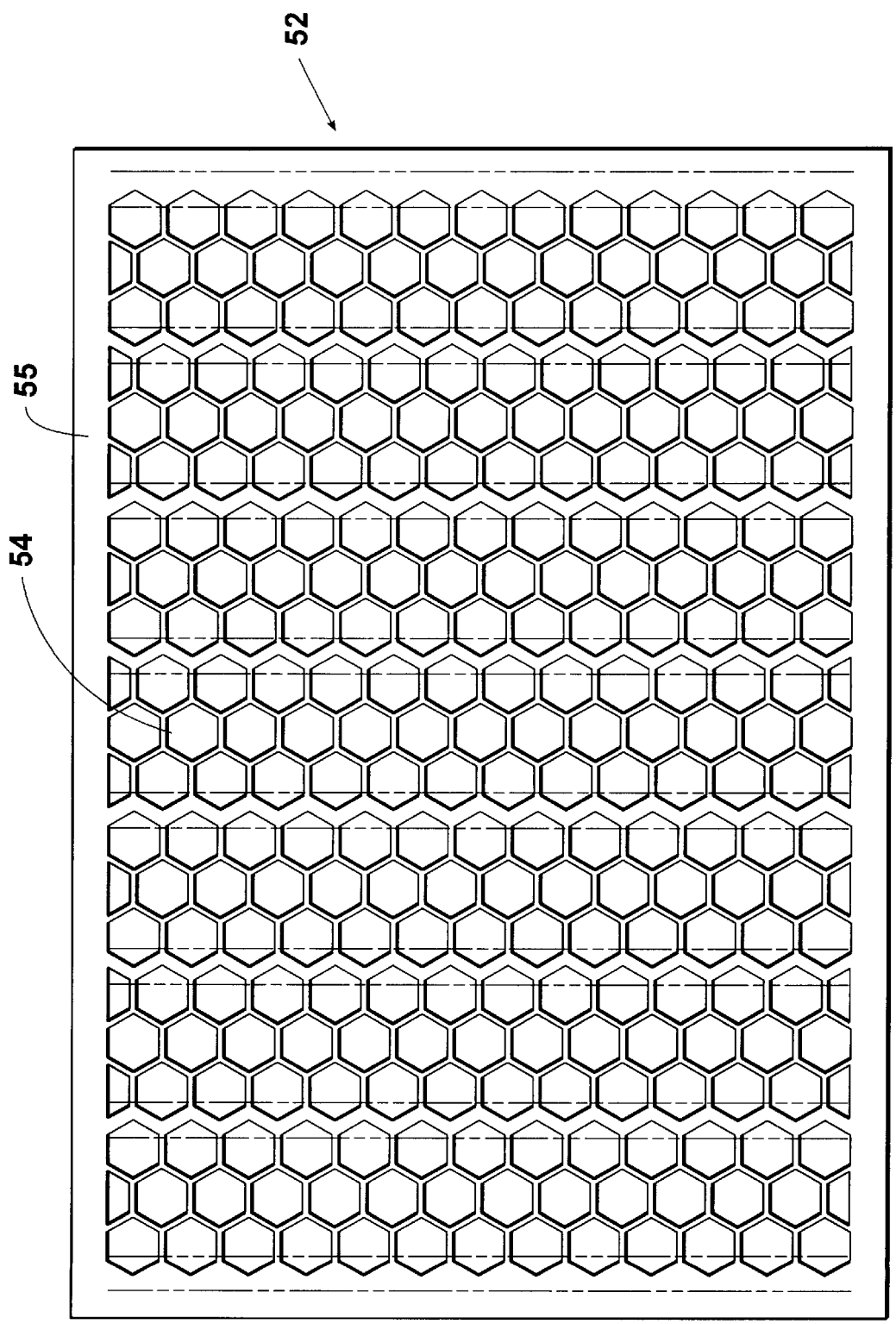
FIG. 3 is a top view of a perforated plate which is an element of the vibrating screen assembly of the present invention.

Referring to the drawings in detail, FIG. 1 illustrates a top view of a frame 12 which is an element of a vibrating screen assembly constructed in accordance with the present invention. FIG. 2 illustrates a sectional view of the frame 12 taken along section line 2—2 of FIG. 1.

The frame 12 includes a pair of opposed sides 14 and 16 and a pair of opposed ends 18 and 20. The sides 14 and 16 are opposed and parallel to each other. Likewise, the ends 18 and 20 are opposed and parallel to each other. All of the sides and the ends may be composed of the same pieces which are cut to size from extruded lengths. In the present embodiment, the sides 14 and 16 along with the end 18 are all composed of the same extruded aluminum material. The end 20 has an additional clip 22 to mate with the vibrating screen machinery (not shown) or to mate with an adjoining screen assembly and is otherwise the same as end 18.

Each side 14 and 16 has a flat, planar surface 24 and 26, respectively. Likewise, each end 18 and 20 has a flat, planar surface 28 and 30, respectively. The flat planar surfaces 24, 26, 28 and 30 are aligned with each other in the assembled frame 12.

Side 14 includes an upstanding lip 32 extending vertically from the planar surface 24. Side 16 includes an upstanding lip 34 extending vertically from the planar surface 26. End 18 includes an upstanding lip 36 extending vertically from the planar surface 28. End 20 includes an upstanding lip 38 extending vertically from the planar surface. The lips 32, 34, 36 and 38 together define an area forming a rim enclosure.

The frame 12 also includes a plurality of tubular cross supports 40, 42, 44, 46, 48 and 50. It will be appreciated that a greater or lesser number of tubular supports might be employed. The tubular supports extend between the sides 14 and 16 and are parallel to ends 18 and 20. The tubular supports in the present embodiment are rectangular in cross-section although other configurations are possible within the scope of the invention.

It has been found that the frame provides superior strength both from side to side and from end to end.

FIG. 3 illustrates a top view of a perforated plate 52. As will be seen, the perforated plate 52 is attached to and secured to the frame in the assembled condition. The perforated plate 52 includes a plurality of openings 54 which are punched or otherwise formed in the plate. The dashed lines in FIG. 3 illustrate the tubular supports and the frame 12 to which the perforated plate 52 will be attached. The perforated plate also includes a border area 55 which will align with the planar surfaces of the frame 12, providing an area for good adhesion between the frame and the plate.

Figure 4:
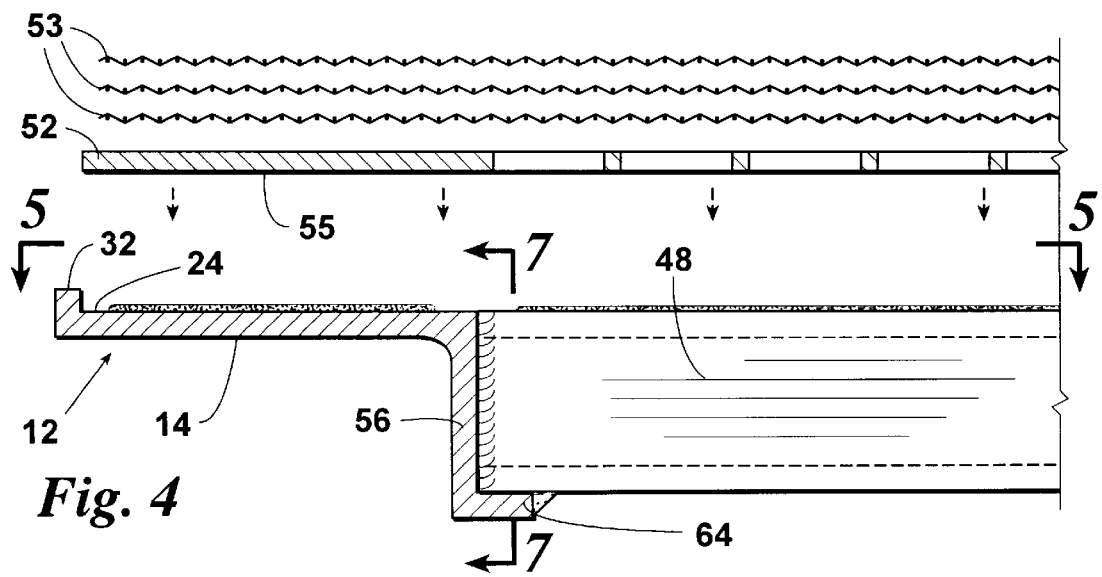
FIG. 4 is a partial, exploded sectional view of the vibrating screen assembly of the present invention.

FIG. 4 illustrates a partial, sectional view of the frame 12, the perforated plate 52, and a plurality of screen cloth layers. Three screen cloth layers are employed in the present embodiment although a greater or lesser number could be utilized.

Each opposed side 14 and 16 includes a downwardly extending leg which extends downward perpendicularly from the planar surface of the side. For example, leg 56 extends perpendicularly downward from planar surface 24. A leg 58 (not seen) extends perpendicularly downward from planar surface 26.

Likewise, as seen in FIG. 2, a leg 60 extends perpendicularly downward from the planar surface 28 of the end 18. A leg 62 extends perpendicularly downward from the planar surface 30 of end 20.

Figure 5:
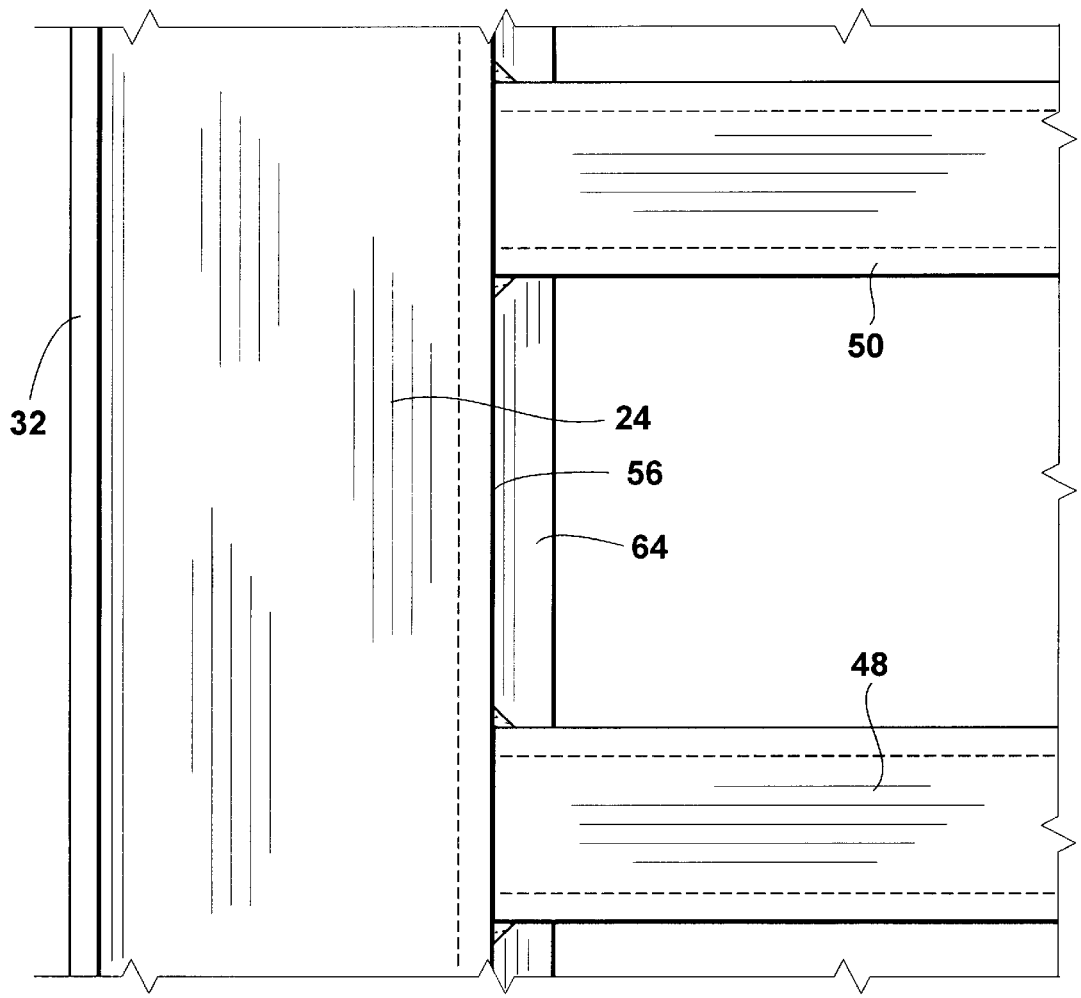
FIG. 5 is a sectional view taken along section line 5—5 of FIG. 4.

Finally, a ledge extends perpendicular to each of the downward legs 56 and 58. As seen in FIG. 4 and FIG. 5 and in the top view of the frame in FIG. 1, a ledge 64 extends perpendicular to the downward leg 56 of side 14. Likewise, a ledge 66 extends perpendicular to the downward leg 58 of side 16. The ledges 64 and 66 are aligned with, opposed to and face each other. The tubular cross supports 40, 42, 44, 46, 48 and 50 each extend between the frame sides 14 and 16. The tubular cross supports rest on and are connected to both the downwardly extending legs 56 and 58 and the ledges 64 and 66. The ledges 64 and 66 (as well as the legs) facilitate welding of each of the cross supports to the sides. Once assembled, the tubular cross supports are aligned with the planar surface.

Figure 6:
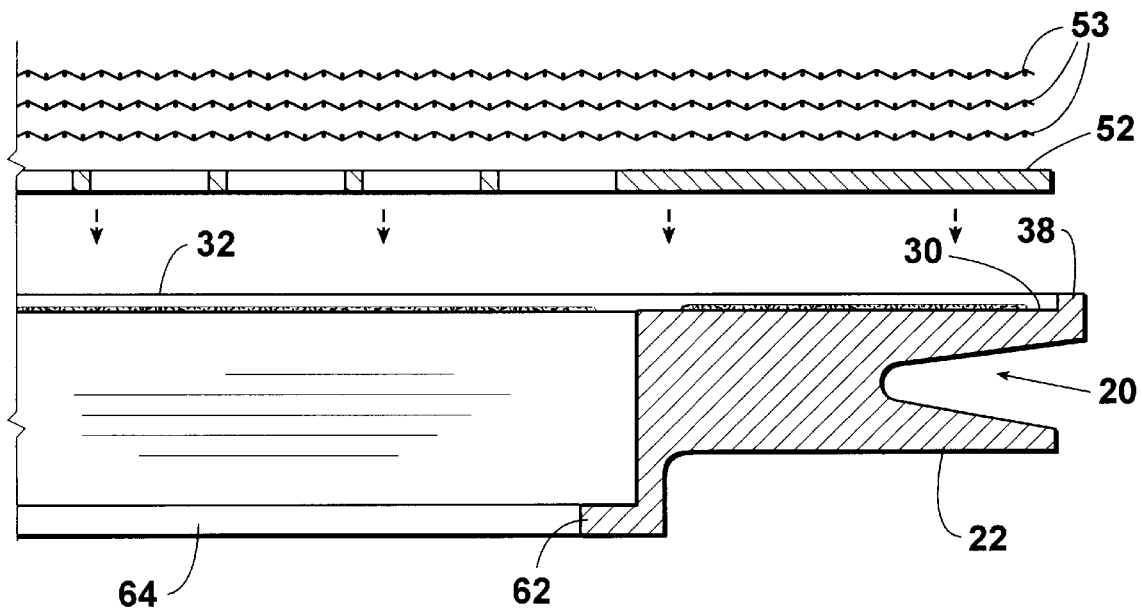
FIG. 6 is a partial, exploded view of a vibrating screen assembly constructed in accordance with the present invention.

FIG. 6 illustrates a partial sectional view of the end 20 including the clip 22. The frame 12 is adhesively secured to the perforated plate 52 with adhesive. The plate 52 and the accompanying screen cloths 53 are aligned on the frame by the lip 38 which, together with the other lips, form a rim enclosure.

Figure 7:
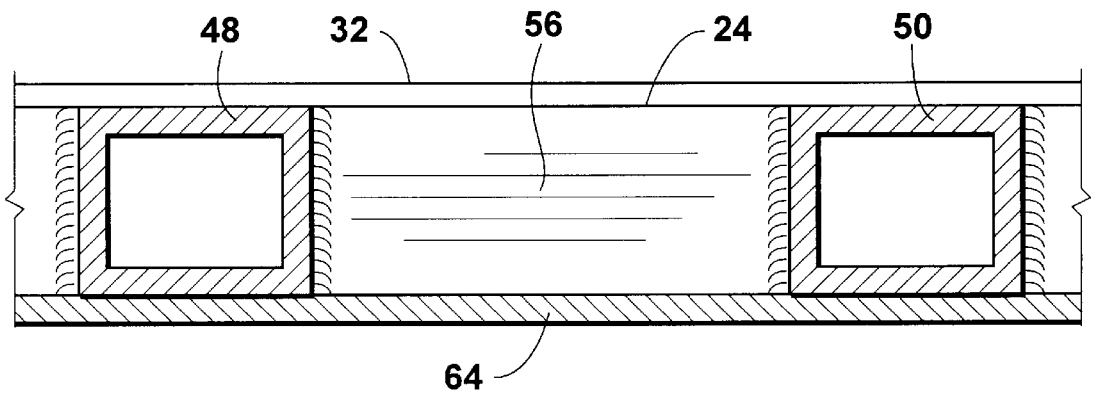
FIG. 7 is a sectional view taken along section line 7—7 of FIG. 4.

Finally, FIG. 7 is a cross-sectional view taken along lines 7—7 of FIG. 4.

The process for producing a vibrating screen assembly 10 of the present invention includes a number of steps. Initially, the sides 14 and 16 and ends 18 and 20 of the frame 12 are extruded in lengths, such as from extruded aluminum. These frame sections are then cut to desired lengths to form a pair of opposed sides 14 and 16 and a pair of ends 18 and 20. All of the sides and ends may be of the same frame design or, as described, end 20 may include a clip 22. The sides and the ends are cut at 45° angles (as best seen in FIG. 1) so that they will mate together to form an exterior frame.

Likewise, lengths of tubular support are extruded, such as from extruded aluminum. The tubular support members 40, 42, 44, 46, 48 and 50 are cut from these lengths to the desired dimensions. The opposed sides and opposed ends are clamped together and then tack welded. Thereafter, the entire frame 12, including the cross supports, is welded together. As previously described, the tubular cross supports rest on the ledges. The connecting weld points may require some minor surface grinding for a smooth finish.

Prior to connecting the perforated plate 52 and accompanying screen cloths 53, the frame may be cleaned with acetone or other cleaner.

The perforated plate 52 is fabricated with hexagonal or other openings and, thereafter, coated with epoxy. Both heat and pressure are used to bond the screen mesh layers to the plate. In the present embodiment, three layers of screen mesh are utilized. Accordingly, the perforated plate and the screen cloths are secured together.

If rough edges of screen mesh extend from the edges of the plate, these may be sheared off. Unlike in the past, it is unnecessary to grind the edges, since the combined plate 52 and screen layers 53 will be received with the rim enclosure of the frame.

The lips which form the rim enclosure form a blunt, safe edge around the perimeter of the screen assembly for safe handling.

The perforated plate and the accompanying screen cloths are, thereafter, secured to the frame 12. The arrows in FIGS. 4 and 6 illustrate this step. A bead of glue or other adhesive is placed on the planar surfaces 24, 26, 28 and 30 of the frame 12. Adhesive may also be applied to the cross supports. In one embodiment, an acrylic adhesive such as methyl methacrylate is used. The lips form a rim enclosure that align the perforated plate on the frame. Once the adhesive has cured, a secure bond is formed.

In usage on vibrating screen machinery, the perforated plate is prevented from moving side to side or end to end with respect to the frame because of the rim enclosure.

The joints between the cross supports and the sides of the frame are strengthened since the cross supports 40, 42, 44, 46, 48 and 50 rest on the ledges. Accordingly, only an upward force would act to separate the cross supports 40, 42, 44, 46, 48 and 50 from the sides.

Whereas, the present invention has been described in relation to the drawings attached hereto, it should be understood that other and further modifications, apart from those shown or suggested herein, may be made within the spirit and scope of this invention.

What is claimed is:

1. A vibrating screen assembly which comprises:

a continuous frame having a planar surface;

a lip extending vertically from said planar surface to form a rim enclosure having a pair of sides and a pair of ends;

a leg extending perpendicularly from said planar surface in a direction away from said lip;

a ledge extending perpendicularly from said downward leg;

a plurality of tubular cross supports resting on said ledge and connected to said leg; and a perforated plate with a plurality of screen cloths thereon positioned within said rim enclosure and secured to said planar surface.

2. A vibrating screen assembly as set forth in claim 1 wherein said continuous frame is extruded and cut in lengths to form sides and ends.

3. A vibrating screen assembly as set forth in claim 1 wherein said continuous frame includes an end having a clip to mate with vibrating screen machinery or an adjoining screen assembly.

* * * * *